Oct. 23, 1951     H. E. HARDEN     2,572,477
GRILLE GUARD FOR AUTOMOBILES
Filed June 24, 1947
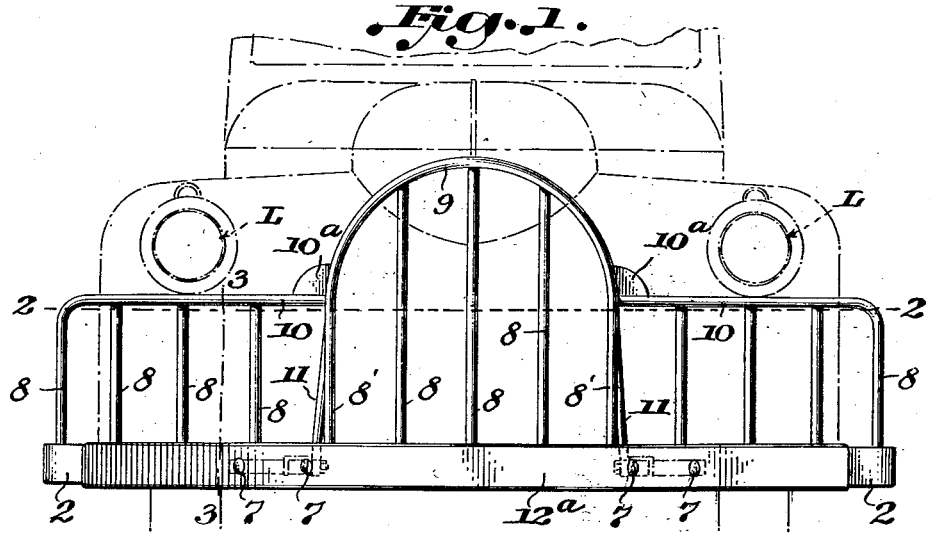
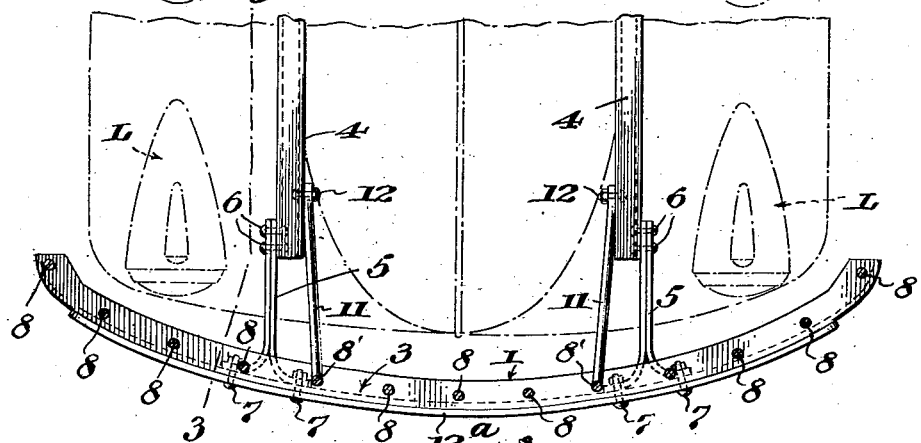
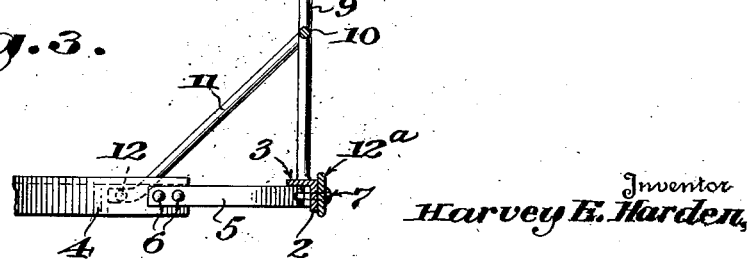

Patented Oct. 23, 1951

2,572,477

UNITED STATES PATENT OFFICE 2,572,477

GRILLE GUARD FOR AUTOMOBILES

Harvey Edwin Harden, Prescott, Ariz.

Application June 24, 1947, Serial No. 756,577

1 Claim. (Cl. 293—60)

The invention relates to new and useful improvements in grill guards for automobiles.

An object of the invention is to provide a grill guard which could be made as a unit, combined with the bumper and attached to the usual brackets for supporting the bumper.

A further object of the invention is to provide a guard of the above type which has a central portion for protecting the grill of the automobile and side portions disposed in front of and below the lamps for protecting the same and also for protecting the front fenders.

These and other objects will in part be obvious and will in part be more fully disclosed.

In the drawings, which show by way of illustration one embodiment of the invention:

Figure 1 is a front view of the combined grill guard unit and the bumper showing in broken lines diagrammatically the attachment of the same to an automobile;

Figure 2 is a horizontal sectional view on the line 2—2 of Figure 1;

Figure 3 is a sectional view on the line 3—3 of Figures 1 and 2.

The invention has to do with a grill guard for automobiles.

The grill guard includes a horizontally disposed supporting bar extending from one side of the automobile to the other which is adapted to be attached to the usual brackets for supporting a bumper. Mounted on this supporting bar at spaced intervals are vertically disposed guard rods. The guard rods at the inner sides of the supporting brackets are extended and joined by an integral arch and the vertical bars therebetween are rigidly connected to said arch. The guard rods at the ends of the supporting bar are extended and formed integral with horizontal bars which terminate at the base portion of the arch and are secured thereto. The rods beneath these horizontal bars are connected to the same and this forms guard sections which protect the lamps of the automobile and the front fenders. There is a base connected to the side frame members of the automobile and to the wheel guard at points adjacent the base of the arch.

Referring more in detail to the drawings, the grill guard includes a horizontally disposed base bar 1. This base bar 1 is made of angle plate and includes a vertical portion 2 and a horizontal portion 3. The supporting base bar extends from one side of the automobile to the other, as shown diagrammatically in Figures 1 and 2, and serves the purpose of a bumper.

The front ends of the side frame members of the automobile are indicated at 4, 4. Supporting brackets 5, 5 are attached to the front ends of these side frame members by suitable bolts indicated at 6, 6. Each bracket has laterally extending portions to which the supporting base bar is secured by bolts 7, 7. Mounted on this base are vertical guard rods 8, 8 which are disposed at spaced intervals along the supporting bar. The guard rods 8', 8' disposed at the inner sides of the brackets 5, 5 are extended upwardly and joined by an arch shaped member 9. The vertically disposed guard rods 8 located between the rods 8', 8' are rigidly connected to this arch shaped member 9, preferably by welding. The rods are also preferably welded to the supporting bar therefor. The guard rods 8, 8 at the ends of the supporting bar are each extended into a horizontal rod 10 with which they are integrally formed. These rods 10 are welded to the arch shaped member 9 and the plates 10ª reinforce the junction between the same. The rods 8 disposed beneath these horizontal bars are rigidly secured thereto, preferably by welding. The arch shaped member 9, together with the guard rods 8', 8' and the guard rods intermediate the same, are disposed directly in front of the grill of the automobile and serve as a protection for the grill.

The horizontal rods 10 are disposed directly beneath the lamps, which are indicated in broken lines at L, L, and these horizontal rods, together with the guard rods therebeneath, provide a protection for the lamps and the front ends of the front fenders. Brace rods 11, 11 are secured by bolts 12, 12 to the side frame members of the automobile and these brace rods extend upwardly as indicated in Figure 3 and are joined to the guard rods 11, 11 at the beginning of the arch shaped member 9. This forms a very strong support for the grill guard.

A chromium plated bar 12ª is disposed in front of the supporting base bar 1 and forms a part of the bump bar and is attached thereto and to the brackets 5, 5 by means of the bolts 7, 7.

The grill guard base bar 1 and the bar 12ª can be made up as a unit and attached to the usual supporting brackets for the bumper bar or the base bar and grill guard may first be attached to the bracket and the chromium plated bar afterward secured to the base bar, thus completing the bumper.

When the grill guard is attached to an automobile, it makes a very excellent protection for the grill of the automobile and for the lamps and front fenders. Furthermore, the base supporting bar of the grill guard really serves as a strong bumper and the chromium plated bar may be more of a facing plate.

It is obvious that minor changes in the details of construction and the arrangement of parts may be made without departing from the spirit of the invention as set forth in the appended claim.

I claim:

A grill guard comprising an inverted L-shaped base bar extending from one side of the automobile to the other, supporting brackets carried by the side frame members of the automobile, said brackets being secured to the depending member of the L-shaped bar, vertically disposed guard rods arranged at spaced intervals along the base bar and rigidly attached to the upper side of the horizontal member of said base bar, an arch shaped rod formed integral with and connecting respectively the rods directly in front of the side frame members, said arch shaped rod being disposed directly in front of the radiator, the rods beneath the arch shaped rod being extended and connected thereto, each rod at the end of the base bar being extended into a horizontal rod disposed in front of and below the respective lamps and connected to said arch shaped rod, the rods beneath each horizontal rod being rigidly connected therewith, and brace members connected to the side frames of the automobile and to the horizontal and arch shaped rods for rigidly supporting the grill.

HARVEY EDWIN HARDEN.

REFERENCES CITED

The following references are of record in the file of this patent:

UNITED STATES PATENTS

| Number | Name | Date |
| --- | --- | --- |
| D. 148,729 | Sterkel | Feb. 17, 1948 |
| D. 148,980 | Bustin | Mar. 16, 1948 |
| 1,687,337 | Jaeger | Oct. 9, 1928 |
| 1,884,228 | Raskin | Oct. 25, 1932 |
| 2,099,789 | Baker | Nov. 23, 1937 |
| 2,173,408 | Carta | Sept. 19, 1939 |
| 2,213,044 | Jandus | Aug. 27, 1940 |